(12) United States Patent
Beck et al.

(10) Patent No.: US 11,507,252 B2
(45) Date of Patent: Nov. 22, 2022

(54) METHODS AND SYSTEMS FOR MONITORING OBJECTS FOR LABELLING

(71) Applicant: PANASONIC INTELLECTUAL PROPERTY MANAGEMENT CO., LTD., Osaka (JP)

(72) Inventors: Ariel Beck, Singapore (SG); Chandra Suwandi Wijaya, Singapore (SG); Khai Jun Kek, Singapore (SG)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 279 days.

(21) Appl. No.: 16/997,441

(22) Filed: Aug. 19, 2020

(65) Prior Publication Data
US 2022/0057901 A1     Feb. 24, 2022

(51) Int. Cl.
| | | |
|---|---|---|
| *G06F 3/0482* | (2013.01) | |
| *G06F 3/04845* | (2022.01) | |
| *G06K 9/62* | (2022.01) | |
| *G06N 20/00* | (2019.01) | |

(52) U.S. Cl.
CPC ........ *G06F 3/0482* (2013.01); *G06F 3/04845* (2013.01); *G06K 9/6215* (2013.01); *G06K 9/6219* (2013.01); *G06K 9/6232* (2013.01); *G06K 9/6272* (2013.01); *G06N 20/00* (2019.01)

(58) Field of Classification Search
CPC .................................................. G06F 3/0482
See application file for complete search history.

(56) References Cited

U.S. PATENT DOCUMENTS

| | | | | |
|---|---|---|---|---|
| 11,194,953 B1 * | 12/2021 | Victoroff | ............... | G06F 40/106 |
| 2006/0195467 A1 * | 8/2006 | Pearce | .................... | G06F 16/40 |
| | | | | 707/E17.135 |
| 2015/0169635 A1 * | 6/2015 | Jing | ........................ | G06F 16/50 |
| | | | | 707/723 |
| 2015/0170333 A1 * | 6/2015 | Jing | ....................... | G06F 16/532 |
| | | | | 345/660 |
| 2016/0004695 A1 * | 1/2016 | Yang | ..................... | G06F 3/0485 |
| | | | | 707/738 |
| 2019/0095800 A1 | 3/2019 | Asbag et al. | | |

FOREIGN PATENT DOCUMENTS

JP          2009-217538 A       9/2009

* cited by examiner

*Primary Examiner* — Asher D Kells
(74) *Attorney, Agent, or Firm* — McDermott Will & Emery LLP

(57) ABSTRACT

A graphical user interface (GUI) for forming hierarchically arranged clusters of items and operating thereupon through an electronic device equipped with an input-device and a display-screen is provided. The GUI comprises a first area configured to display a graphical-tree representation having a plurality of hierarchical levels, each of said level corresponds to at least one cluster of content-items formed by execution of a machine-learning classifier over a plurality of input content items. A second area is configured to display a dataset corresponding to the content-items classified within the clusters. A third area is configured to display a plurality of types of content representations with respect to each selected cluster, said representations corresponding to content-items classified within the cluster.

10 Claims, 16 Drawing Sheets

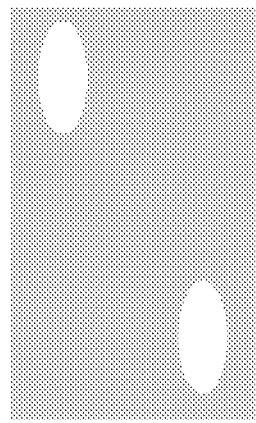
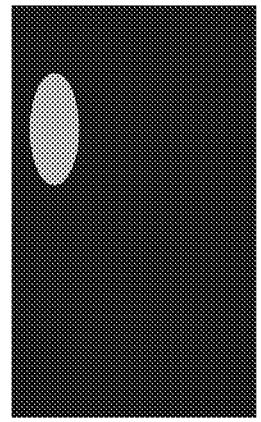
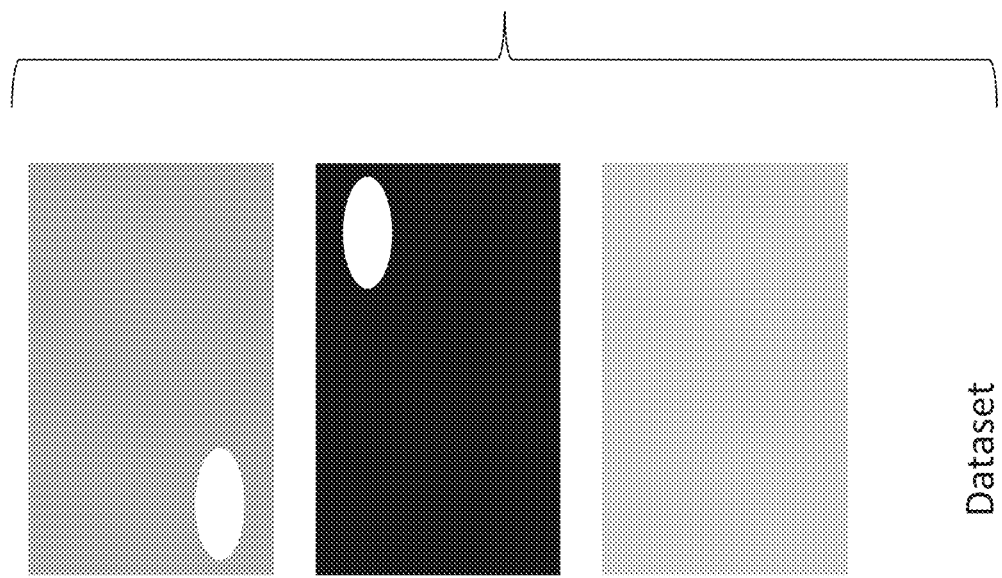
Figure 9

| | A | B | C | D | E | F | G | H | I | J |
|---|---|---|---|---|---|---|---|---|---|---|
| 1 | Filename | class | mean_dark | min_dark | max_dark | med_dark | skew_dark | kur_dark | stdev_dark | aspt_dark |
| 3 | Z:\Project\AI Visual Inspection\SPCAP\images\DATASET (Camera 2&3)\Batch 1\OK\BEx.AnoCAM21_ | 2 | 30.54379 | 17 | 255 | 25 | 7.112996 | 53.31484 | 26.06665 | 0.9375 |
| 5 | Z:\Project\AI Visual Inspection\SPCAP\images\DATASET (Camera 2&3)\Batch 1\OK\BEx.AnoCAM31_ | 2 | 35.672 | 20 | 255 | 29 | 6.489093 | 44.61899 | 29.15809 | 0.9375 |
| 7 | Z:\Project\AI Visual Inspection\SPCAP\images\DATASET (Camera 2&3)\Batch 1\OK\BEx.AnoCAM31_ | 2 | 35.22369 | 19 | 255 | 29 | 6.573502 | 46.65365 | 27.69879 | 0.9375 |
| 9 | Z:\Project\AI Visual Inspection\SPCAP\images\DATASET (Camera 2&3)\Batch 1\OK\BEx.AnoCAM31_ | 2 | 35.43724 | 20 | 255 | 29 | 6.561703 | 45.73319 | 28.5704 | 0.9375 |
| 11 | Z:\Project\AI Visual Inspection\SPCAP\images\DATASET (Camera 2&3)\Batch 1\OK\BEx.AnoCAM21_ | 2 | 35.658 | 20 | 255 | 29 | 6.542362 | 45.63775 | 28.47089 | 0.9375 |
| 13 | Z:\Project\AI Visual Inspection\SPCAP\images\DATASET (Camera 2&3)\Batch 1\OK\BEx.AnoCAM31_ | 2 | 30.74057 | 17 | 255 | 25 | 7.12986 | 53.00122 | 27.15659 | 0.9375 |
| 15 | Z:\Project\AI Visual Inspection\SPCAP\images\DATASET (Camera 2&3)\Batch 1\OK\BT.BurrCAM31_ | 2 | 35.48542 | 19 | 255 | 29 | 6.604464 | 45.12749 | 29.45848 | 0.9375 |
| 17 | Z:\Project\AI Visual Inspection\SPCAP\images\DATASET (Camera 2&3)\Batch 1\OK\BT.DENCAM31_( | 2 | 35.42366 | 20 | 255 | 29 | 6.625764 | 45.92512 | 29.11996 | 0.9375 |
| 19 | Z:\Project\AI Visual Inspection\SPCAP\images\DATASET (Camera 2&3)\Batch 1\OK\BEx.AnoCAM21_ | 2 | 30.84694 | 17 | 255 | 25 | 6.982599 | 50.83294 | 27.56476 | 0.9375 |
| 21 | Z:\Project\AI Visual Inspection\SPCAP\images\DATASET (Camera 2&3)\Batch 1\OK\BEx.AnoCAM21_ | 2 | 30.69391 | 17 | 255 | 25 | 7.069775 | 51.92536 | 27.54644 | 0.9375 |

Figure 12

METHODS AND SYSTEMS FOR MONITORING OBJECTS FOR LABELLING

TECHNICAL FIELD

The present invention relates to inspection and in particular relates to labelling of data set based machine-learning (ML).

BACKGROUND

In Machine learning (ML) classification, a common classifier is probabilistic classifier. A probabilistic classifier is a classifier that is able to predict, given an observation of an input, a probability distribution over a set of classes, rather than only outputting the most likely class that the observation should belong to. An example distribution of probabilities range from 0.0 to 0.9, 0 to 99%, a scale from 0 to 9, a grade from 1 to 5, etc.

Clustering by ML done as a part of said classification often falls short of expectation since in real life situation there are always boundary cases and prevalence of ambiguity. For such purposes, such type of ML system requires annotated data for training. However, annotating a big amount of data, one by one, is time consuming.

Conventional mechanisms use unsupervised learning (clustering), to group images and then request the user to provide one annotation or label for each group. Such approaches render a fixed number of clusters as each image belongs only to one cluster. Having fixed number of clusters in real-life scenario (e.g. image inspection drill) is not very helpful, since most of the time there will be images grouped wrongly through the ML classifiers, resulting in non-coherent clusters. To put it differently, giving one single-label to the automatically formed clusters does not render accuracy and efficiency in real life scenarios such image quality control processes.

There lies at least a need for a control that allows an operator to label his data using clustering M.L without being constrained by a fixed number of clusters.

There lies at least a need to allow the operator to visualize the full dataset formed as a result of clustering:

There lies at least a need to allow the operator to choose the appropriate clusters among many clusters and allow a user-defined iterative labelling of dataset.

SUMMARY

This summary is provided to introduce a selection of concepts in a simplified format that are further described in the detailed description of the present disclosure. This summary is not intended to identify key or essential inventive concepts of the claimed subject matter, nor is it intended for determining the scope of the claimed subject matter. In accordance with the purposes of the disclosure, the present disclosure as embodied and broadly described herein, describes method and system for predicting a condition of living-being in an environment.

In accordance with some example embodiments of the inventive concepts, the present subject matter describes a graphical user interface (GUI) A graphical user interface (GUI) for forming hierarchically arranged clusters of images and operating thereupon through an electronic device equipped with an input-device and a display-screen. The GUI comprises a first area configured to display a graphical-tree representation having a plurality of hierarchical levels, each of said level corresponds to at least one cluster of images formed by a machine-learning classifier applied over a plurality of input-images. A second area is configured to display a dataset corresponding to the images within the clusters, and a third area is configured to display a plurality of types of image representations with respect to each cluster, wherein the image representations correspond to images within the cluster.

In other implementation, each of said level corresponds to at least one cluster of content-items formed by execution of a machine-learning classifier over a plurality of input content items, wherein the content items may be any single media or multimedia file such as audio, text or acoustic data. Accordingly, a second area may be configured to display a dataset corresponding to the content-items classified within the clusters. A third area configured to display a plurality of types of content representations with respect to each selected cluster.

In accordance with other example embodiments of the inventive concepts, the present subject matter describes a method implemented in a computing-device with a display screen for forming hierarchically arranged clusters of images and operating thereupon. The method comprises extracting one or more features of a plurality of received images, classifying the received images by a machine-learning classifier into a plurality of clusters based on similarity of features, arranging the clusters hierarchically in accordance with a plurality of levels to display a graphical-tree representation having a plurality of hierarchical levels, displaying a dataset corresponding to the images within the clusters, and generating a plurality of types of image representations with respect to each cluster.

The objects and advantages of the embodiments will be realized and achieved at-least by the elements, features, and combinations particularly pointed out in the claims. It is to be understood that both the foregoing general description and the following detailed description are representative and explanatory and are not restrictive of the invention, as claimed.

BRIEF DESCRIPTION OF THE DRAWINGS

Further, skilled artisans will appreciate that elements in the drawings are illustrated for simplicity and may not have been necessarily been drawn to scale. For example, the flow charts illustrate the method in terms of the most prominent steps involved to help to improve understanding of aspects of the present invention. Furthermore, in terms of the construction of the device, one or more components of the device may have been represented in the drawings by conventional symbols, and the drawings may show only those specific details that are pertinent to understanding the embodiments of the present invention so as not to obscure the drawings with details that will be readily apparent to those of ordinary skill in the art having benefit of the description herein.

FIG. 9 illustrates an example representative images for a cluster, in accordance with another embodiment of the present disclosure;

FIG. 12 illustrates an example outcome from the GUI, in accordance with another embodiment of the present disclosure;

Figure 1:
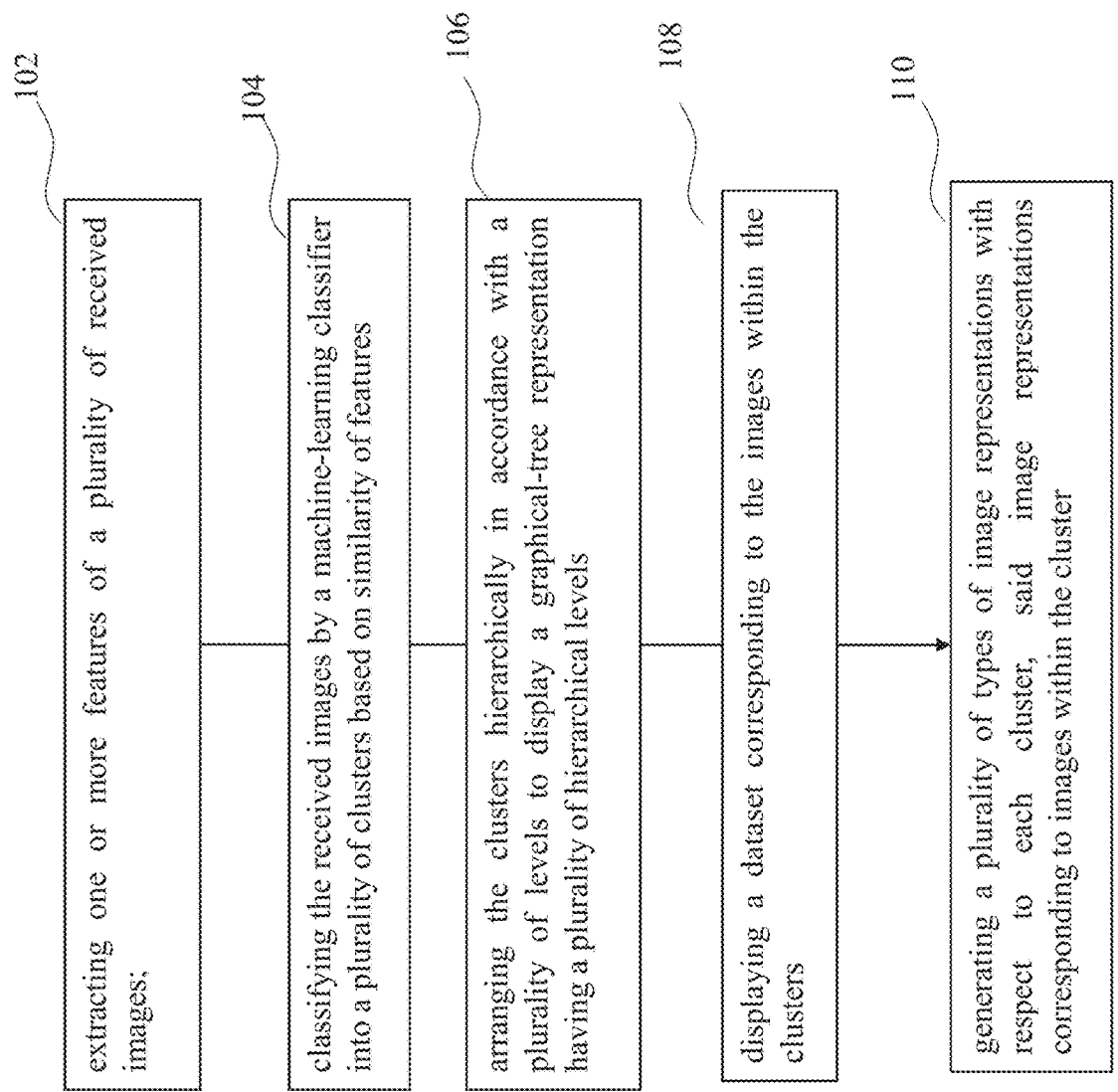
FIG. 1 illustrates a method for assisting image-labelling in a computing-device, in accordance with the embodiment of the present disclosure.

The elements in the drawings are illustrated for simplicity and may not have been necessarily been drawn to scale. Furthermore, in terms of the construction of the device, one or more components of the device may have been represented in the drawings by conventional symbols, and the drawings may show only those specific details that are pertinent to understanding the embodiments of the present disclosure so as not to obscure the drawings with details that will be readily apparent to those of ordinary skill in the art having benefit of the description herein.

DETAILED DESCRIPTION

For the purpose of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated system, and such further applications of the principles of the invention as illustrated therein being contemplated as would normally occur to one skilled in the art to which the invention relates.

It will be understood by those skilled in the art that the foregoing general description and the following detailed description are explanatory of the invention and are not intended to be restrictive thereof.

Reference throughout this specification to "an aspect", "another aspect" or similar language means that a particular feature, structure, or characteristic described in connection with the embodiment is included in at least one embodiment of the present invention. Thus, appearances of the phrase "in an embodiment", "in another embodiment" and similar language throughout this specification may, but do not necessarily, all refer to the same embodiment.

The terms "comprises", "comprising", or any other variations thereof, are intended to cover a non-exclusive inclusion, such that a process or method that comprises a list of steps does not include only those steps but may include other steps not expressly listed or inherent to such process or method. Similarly, one or more devices or sub-systems or elements or structures or components proceeded by "comprises . . . a" does not, without more constraints, preclude the existence of other devices or other sub-systems or other elements or other structures or other components or additional devices or additional sub-systems or additional elements or additional structures or additional components.

Unless otherwise defined, all technical and scientific terms used herein have the same meaning as commonly understood by one of ordinary skilled in the art to which this invention belongs. The system, methods, and examples provided herein are illustrative only and not intended to be limiting.

Embodiments of the present subject matter are described below in detail with reference to the accompanying drawings.

FIG. 1 illustrates a method implemented in a computing-device with a display screen for forming hierarchically arranged clusters of images or any other single media/multimedia data and operating thereupon image-labelling. The method comprises extracting (step 102) one or more features of a plurality of received images or the single/multimedia data item, for example based on a resnet feature extractor. Based on similarity of features, the received images/items are classified (step 104) by a machine-learning classifier into a plurality of clusters. Further, the plurality of clusters are arranged (step 106) hierarchically in accordance with a plurality of levels to display a graphical-tree representation having a plurality of hierarchical levels, for example, as a dendrogram or any other hierarchy based diagrammatic representation of cluster.

Alongside the represented dendrogram, a dataset corresponding to the images/data items within the clusters is displayed (step 108). The dataset may be an image dataset and hierarchically clustered by an unsupervised learning method based on brightness values of pixels within the image dataset. The layer forming a part of the machine learning classifier may be for example softmax layer or zigmoid layer.

With respect to said dendrogram, a user-input is received in relation to the generation of the graphical tree representation. The user-input is defined by reducing latent-space dimensions associated with the captured features of the input images. Also, another user input relates to changing the hierarchical levels associated with the graphical tree representations.

Further, the method comprises generating (step 110) a plurality of types of image representations with respect to each cluster, said image representations corresponding to actual-images within the cluster or hybrid images created with respect to the images in the cluster. The generating of the image representations comprises generating at-least one of an example image closest to the centroid of the cluster, an outlier image farthest from centroid of the cluster, and a first hybrid image generated with respect to the cluster. With respect to the hybrid image, a constituent element of first hybrid image bears a smallest pixel value among a dataset associated with the cluster. In addition with respect to a second hybrid image generated with respect to the cluster, a constituent element of the second hybrid item bears a largest pixel value among a dataset associated with the cluster.

With respect to the clusters in the dendrogram, a cluster identifier may be received from a user for selecting one or more clusters within said tree representation for inspecting contents of the cluster. The selection is defined by change in color of the selected cluster in the first area and highlighting of a dataset in the second area belonging to the selected cluster. Thereafter, with respect to an inspected and approved cluster, a cluster-label may be received from a user for the selected cluster for labelling the images associated with cluster.

In other implementation, the present subject matter may be construed to cover other multimedia content items such as sound, text and video. In such a scenario, each level in the dendrogram corresponds to at-least one cluster of such multimedia content-items. Accordingly, the third area may be configured to either play a sound or video or display text as a part of depicting plurality of types of content-representations with respect to each selected cluster corresponding to the content-items classified within the clusters.

Figure 2:
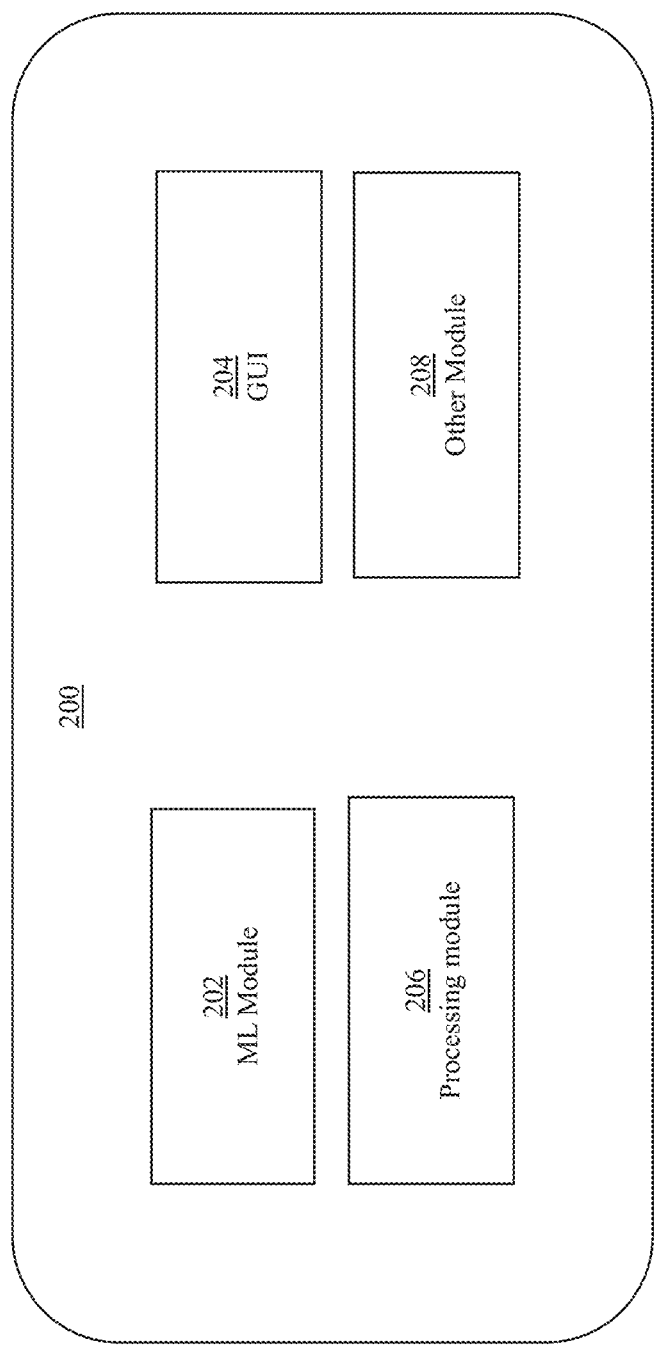
FIG. 2 illustrates a schematic-architecture for assisting image-labelling in a computing-device, in accordance with an embodiment of the present disclosure.

FIG. 2 illustrates a schematic-architecture and an internal-construction of a system 200 in accordance with the embodiment of the present invention. The system 200 includes an ML module 202 that performs the step 102, 104 and a GUI 204 that performs that step 106, 108 and 110. Likewise, there may be a processing module 206 and a miscellaneous module 208 within the system 200 that facilitate operational-interconnection among the modules 202 till 204 and perform other ancillary-functions such image generation, content generation, image transfer to a folder etc.

Figure 3:
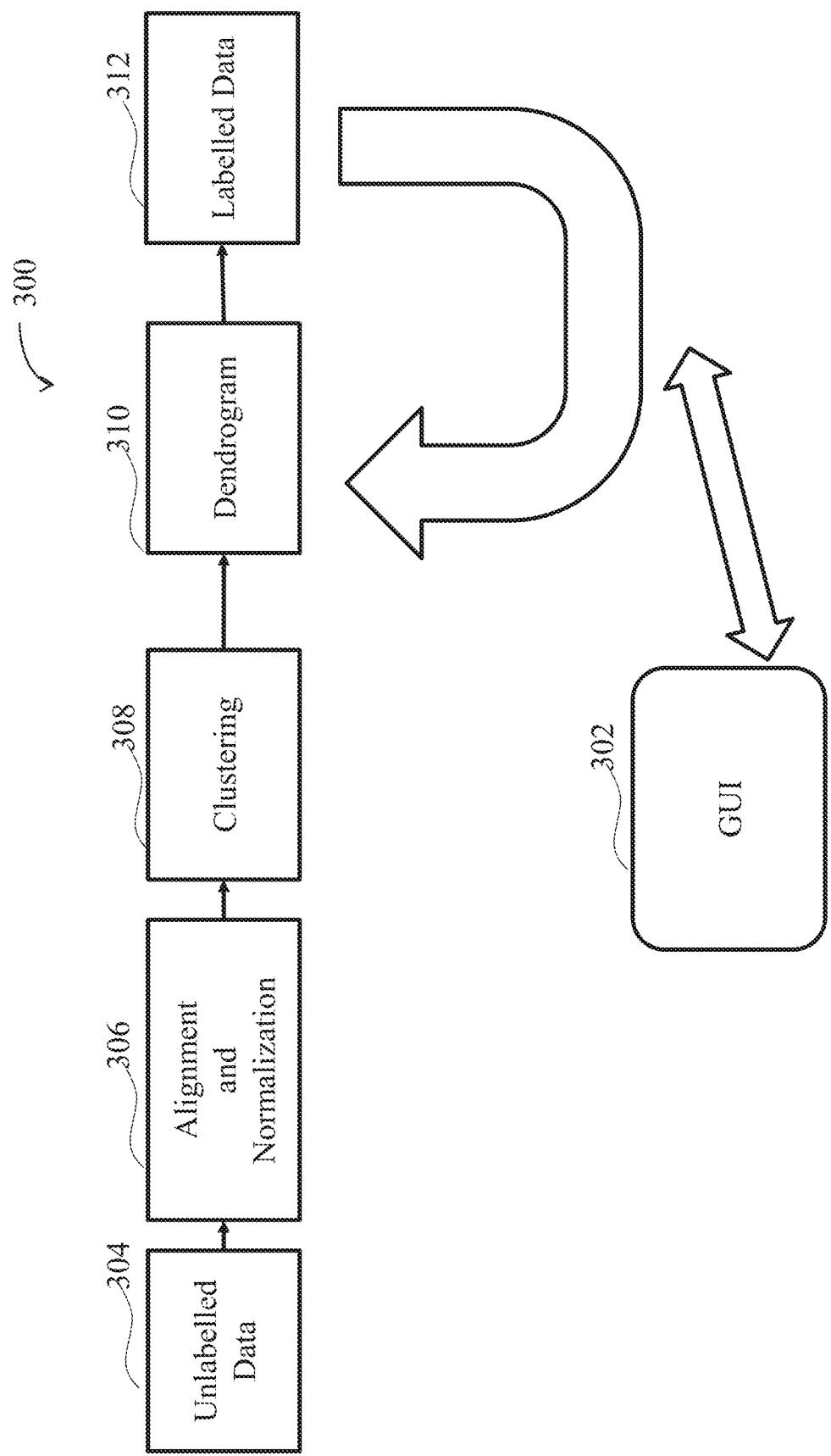
FIG. 3 illustrates an example method for assisting image-labelling based on computing device and GUI, in accordance with the embodiment of the present disclosure.

FIG. 3 illustrates a schematic-architecture comprising a machine-learning or AI based system 300 corresponding to the module 204 and a graphical user interface (GUI) 302 corresponding to the module 204 for enabling image labelling on an electronic device provided with an input-device and a display-screen. The system 300 is configured to perform the steps 304 till 312 in association with the GUI 302 and the user input provided through the GUI 302.

Step 304 represents the input images or unlabeled data which are the raw images from the factory line.

Step 306 corresponds to an image-alignment system may be a state of the art module such as SPCAP, PECGI, PICN etc for aligning an object (detected in the image) within image frame as per industrial standards to thereby propagate the object for quality-control through aid of image inspection process. All images are normalized and placed uniformly.

Step 308 represents clustering of images in accordance with steps 102 and 104.

Step 310 represents a dendrogram formation in accordance with step 106.

Step 312 represents labelled data set associated with clusters in accordance with step 108.

The GUI 302 renders a display the generated image representations with respect to cluster and accordingly renders the display in accordance with method step 110. Further, GUI 302 renders a plurality of controls as defined at least in FIG. 6, FIG. 7 and FIG. 11 for modifying the latent space dimensions for clustering, the depth levels for the dendrogram, observing and approving one or more of the formed clusters, exporting dataset or labels related to the approved clusters, and finally a transfer of image files to an image folder representing the cluster label. The cluster label is automatically propagated to all the corresponding images. Accordingly, the GUI 302 in association with a processing module of the underlying computing environment is configured to execute based on the user operation as defined in forthcoming figures.

Figure 4:
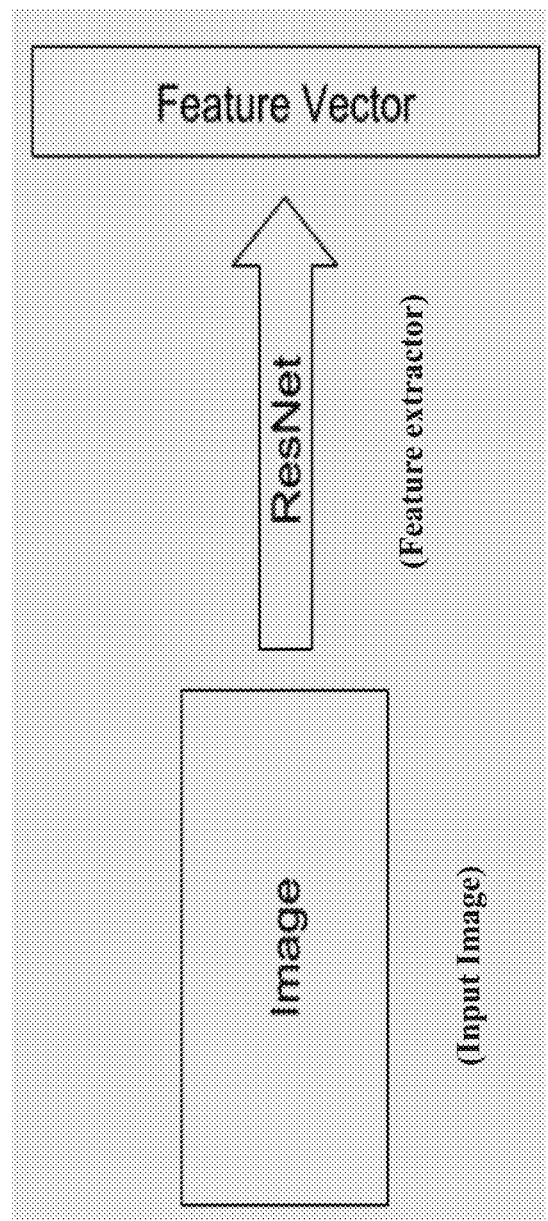
FIG. 4 illustrates an example method for extracting image features, in accordance with the embodiment of the present disclosure.

FIG. 4 represents an example machine learning feature extractor with respect to the received images at step 304. In an example, a Resnet feature extractor extracts the features from the images and converts them into a feature vector based on standard machine learning principle such as hot encoding. The feature vector is dimensioned in accordance with standard dimensions of a latent space. Likewise, the features may be extracted with respect to other single media or multimedia content-items.

In an example, the features with respect to the image be texture, color, shape information. In other example, the features with respect to audio/video may be sound-duration, image-duration, pitch, zero-crossing rate, the signal-bandwidth, the spectral centroid, signal-energy, etc. In respect of text, the features as extracted may be keywords, name-entities, frequency of text etc.

Figure 5:
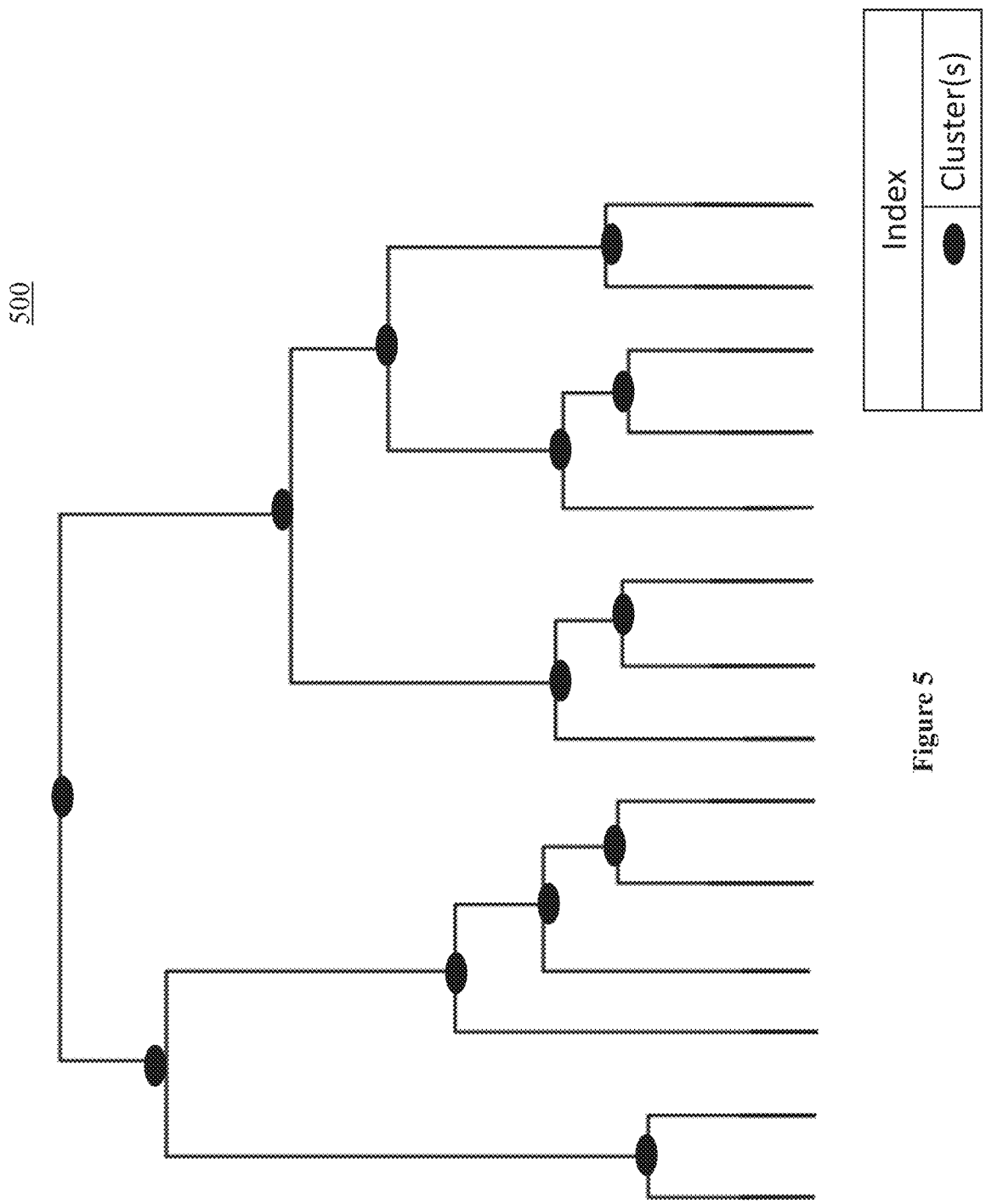
FIG. 5 illustrates an example dendrogram representing clustering of image at various levels, in accordance with the embodiment of the present disclosure.

FIG. 5 illustrates an example dendrogram 500 comprising the hierarchy of clusters formed by a machine learning classifier within the system 300 based on the extracted images. In an example, the hierarchy levels may be 6 in accordance with the present example. Likewise, the classifier may be construed to cover generation of other example graphical-representations such as binary tree representations or any other graphical tree representations.

In other example, the clusters can be formed using features extracted from single media content such as sound or text. In yet another example, features from sound and images can be combined to cluster multimedia data such as videos. In such multimedia, the features vector can be formed by combining features from both domains.

Figure 6:
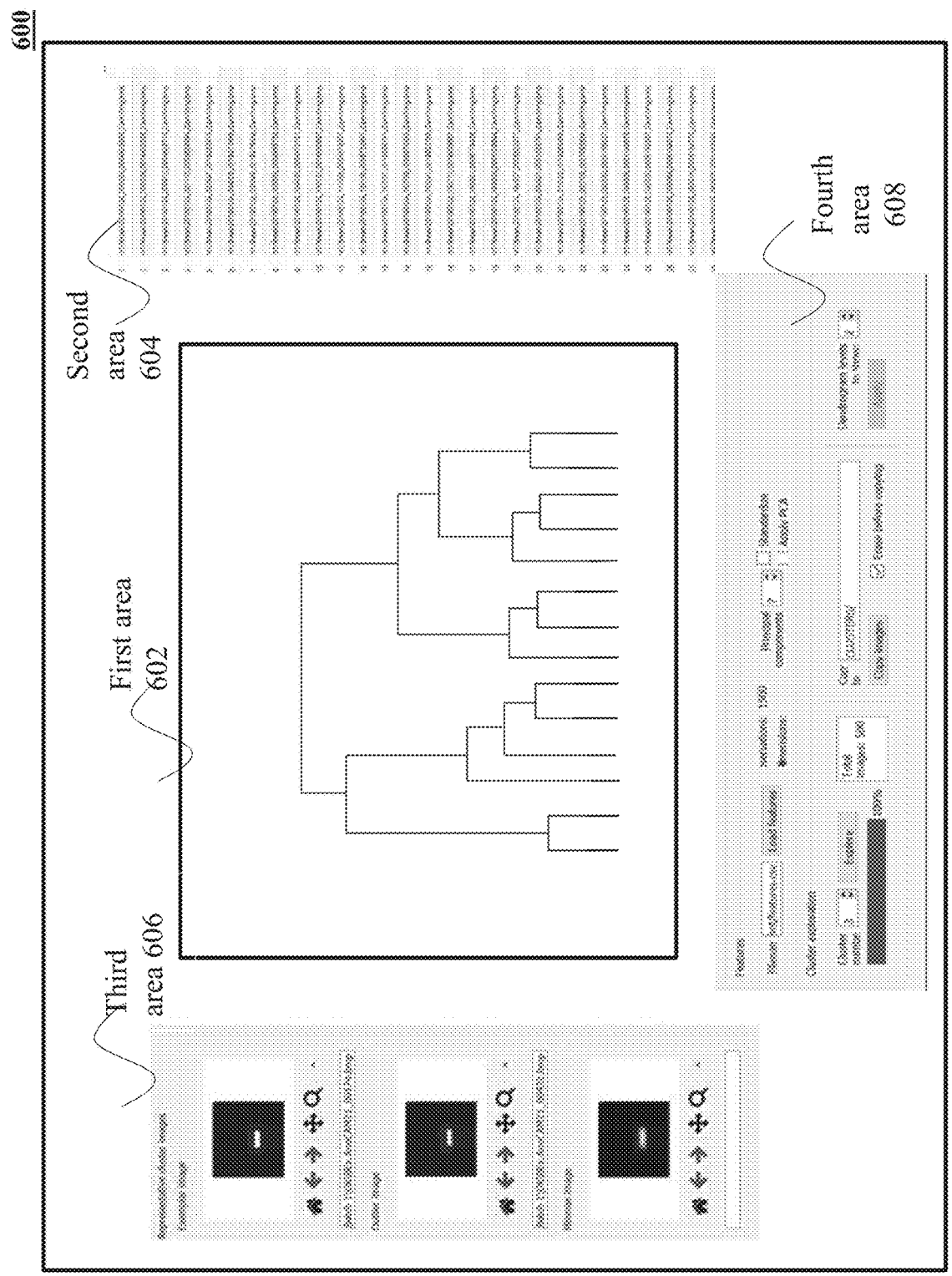
FIG. 6 illustrates a graphical user interface (GUI) for assisting image-labelling, in accordance with another embodiment of the present disclosure.

FIG. 6 represents a graphical user interface (GUI) 600 (corresponding to the GUI 302) for assisting image-inspection and labeling of images, in accordance with another embodiment of the present disclosure. The elements in the GUI allow an operator to label his data using clustering ML.

More specifically, the GUI 600 is provided for forming hierarchically arranged clusters of images and operating thereupon through an electronic device equipped with an input-device and a display-screen. The GUI 600 comprises a first area 602 configured to display a graphical-tree representation such as the dendrogram having a plurality of hierarchical levels, wherein each of said level corresponds to at least one cluster of images formed by a machine-learning classifier applied over the plurality of input-images. The dendrogram allows the operator to visualize the full dataset in a concise manner through number of clusters.

A second area 604 is configured to display a dataset corresponding to the images within the clusters. The dataset is an image dataset and hierarchically clustered by an unsupervised learning method based on brightness values of pixels within the image dataset, wherein said learning method forms a part of the machine learning classifier.

A third area within the GUI 606 is configured to display a plurality of types of image representations with respect to each cluster, said image representation corresponding to images within the cluster. These images allow the operator to understand the content of each cluster. The user can visualize most typical samples in the cluster as well outliers. By observing both, the user may understand the full cluster content.

A fourth area 608 having a plurality of user operable graphical tools is capable of performing a plurality of functions based on user-inputs. These tools allow for navigation between clusters as well as set some different options in order to fine-tune the clustering. The same may also be construed to cover a user-selection among different clustering algorithms, adoption of difference distance functions and so on.

Figure 7:
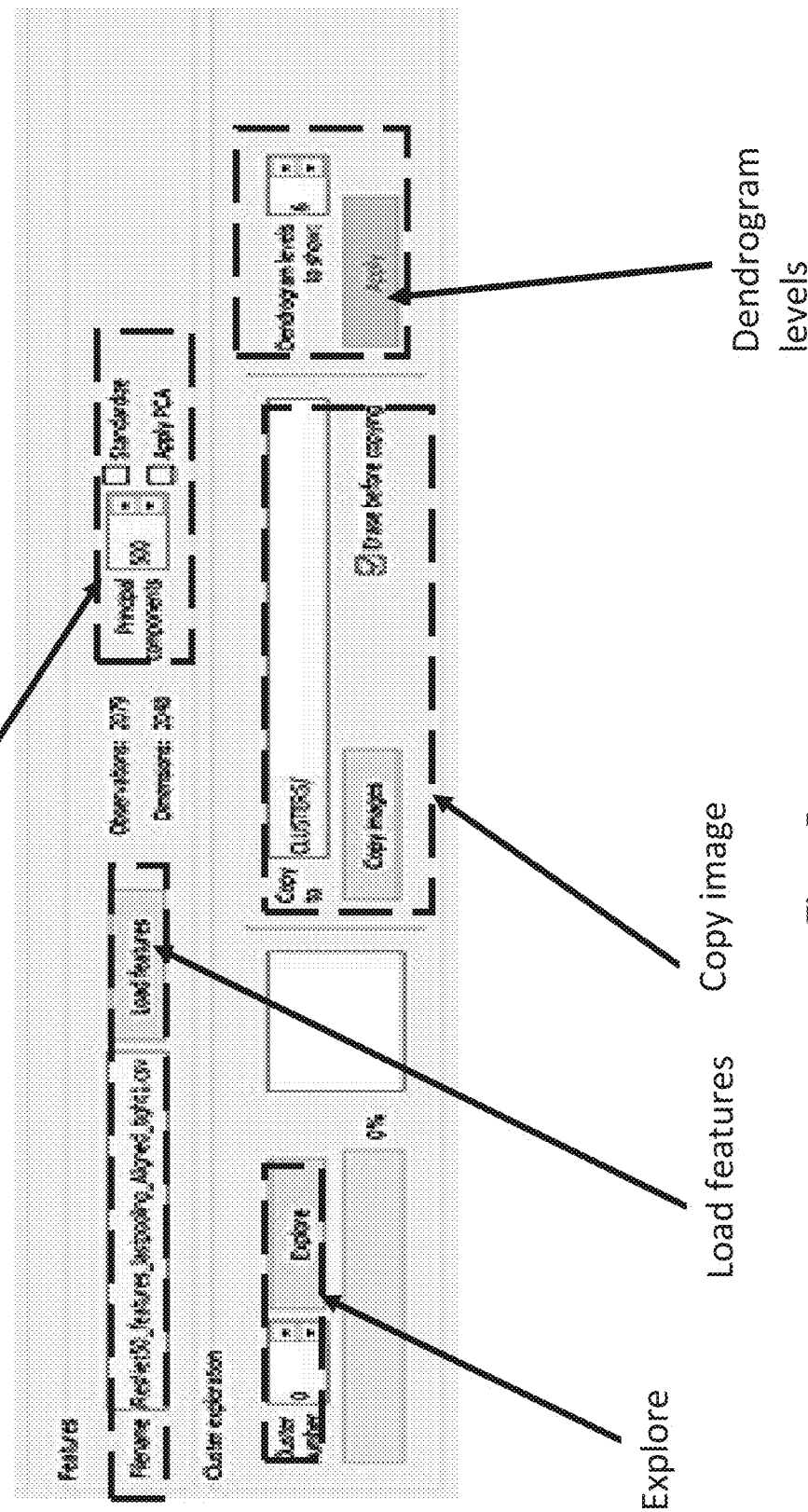
FIG. 7 illustrates example GUI representation, in accordance with another embodiment of the present disclosure.

FIG. 7 illustrates the fourth area 608 area as an example GUI representation for depicting the controls for the user to operate upon the labelling process. More specifically, FIG. 7 illustrates a user-operable graphical tool "Load features" forming a part of as initial step for initiating calculation of the similarities among the unlabelled dataset based on the features. The calculation comprises capturing features of the plurality of input images based on feature-extraction criteria as depicted in FIG. 4 and thereafter classifying the images among one or more clusters based on feature-similarity in accordance with FIG. 5. In accordance with said FIG. 5, the clusters may be ranked to create a dendrogram representation in the first area 602 as said graphical-tree representation. In accordance with said hierarchy, the labeled data set is sequentially arranged in the second area 604 in accordance with the dendrogram.

As a part of said button named "Load features", a different set of features of the input image are loaded. These are used to compute the distances among the various samples (i.e. different input images). In an example, the feature extraction involves Resnet features, statistical features and adding image processing based features (i.e HOG and so on).

In addition, a second graphical tool "Principal component analysis" is provided in the fourth area 608 operable for reducing latent-space dimensions associated with the captured features of the input images. In an example, the 2048 image features of the latent space may be reduced to either 500 or even smaller 10 features. The reduction of features in the dimensions space assists a fast processing and quick cluster formation with improvement. Another sub-control associated with the second tool enables the user at achieving standardization of certain aspects of images, such as brightness.

In an example, "Principal component analysis" or PCA reduces the features dimension space. It helps speed up computation and can improve the clustering in some case. PCA is used to reduce the features dimension as for instance RESNET produce thousands of features. PCA may reduce such features to a fixed number that can then be used to generate the clusters. In an example, through a button named "Principal components", the user selects the number of components or features to be considered for the PCA. Through a button named "Standardization", the user equalizes the lighting condition across all the images. Through a button named "Apply PCA", the PCA is computed and the output is used to do the clustering and update the dendrogram in the first area 602.

Further, the GUI 600 comprises a third graphical tool in the fourth area operable for changing the hierarchical levels of the graphical tree representation. In an example, via the button name "Dendrogram level", the user may change the hierarchical level of clusters. This modifies the number of split and the depth of the dendrogram. It allows for finer clustering when needed. Dendrogram level is used to set the depth of each tree. The deeper the tree, the more are clusters and a fine grained the labelling may be done, although the same may prove time consuming. In an example, the dendrogram in FIG. 6 represents 8 levels which have been done in accordance with user input entered as "6". Thereafter the user can also modify it to 8, which in turn modifies the number of split and the depth of the dendrogram. It allows for finer clustering when needed.

Further, a fourth graphical tool named "Explore" is provided in the fourth area 608 to receive a cluster identifier from a user to select one or more clusters within said tree representation in the first area 602. Such selection is highlighted by change in color of the selected cluster within the dendrogram in the first area 602 and highlighting of dataset in the second area 604 associated with the selected cluster.

In an example, through the button named "Explore", the user may enter a cluster number "468" as a numerical value in a text box. Accordingly, the Cluster "468" in the dendrogram becomes grey color. Within the second area 604 on the right, all images linked to the cluster will be highlighted. Said example illustration with respect to dendrogram and the second area 604 has been also depicted in FIG. 8

Figure 8:
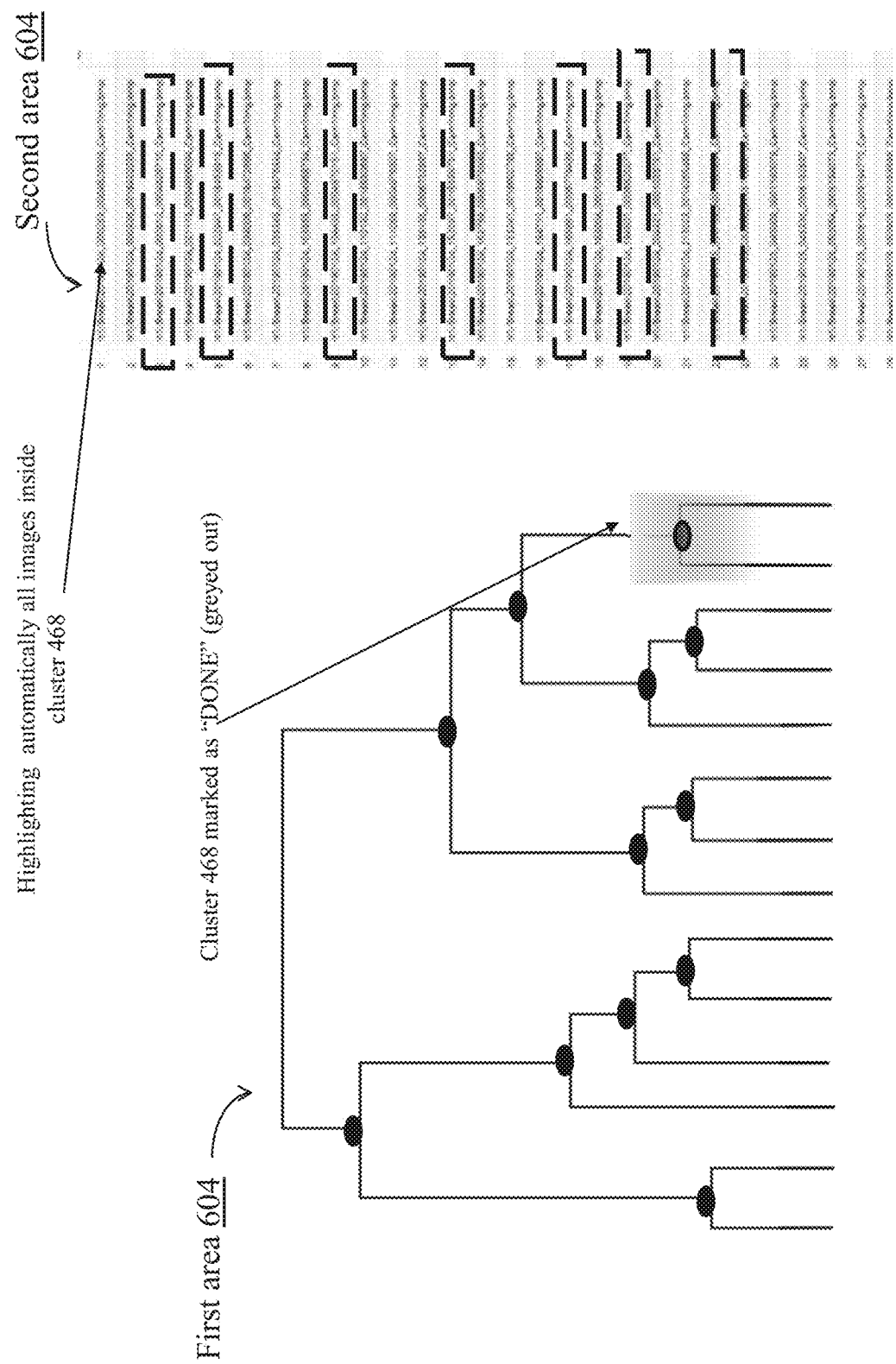
FIG. 8 illustrates another example GUI representation, in accordance with another embodiment of the present disclosure.

Further, a fifth graphical tool "Copy image" is provided in the fourth area 608 to optionally receive a cluster-label from a user for the selected cluster for labelling the images associated with the cluster and triggering storage or copying of the images in the labelled folder FIG. 8 illustrates another example GUI representation wherein a direct user selection of the clusters in the dendrogram in the first area 602 enables selection of the cluster. Accordingly, a corresponding dataset related to the selected cluster in the second area 604 also gets annotated or highlighted similar to the outcome as achieved through "Explore" button in FIG. 7.

In an example, the user selects cluster (say cluster number 468) by clicking directly within any portion of the dendrogram in the first area 602. The randomly chosen cluster "468" turns up in grey color. Within the second area 604 the on the right, all images linked to the cluster will be highlighted.

FIG. 9 illustrates a plurality of types of image-representations in the third area 606 with respect to the selected cluster (say cluster 468 in FIG. 8). A first hybrid image generated with respect to the cluster represents a minima image, wherein a constituent element of first hybrid item bears a smallest pixel value among a dataset associated with the cluster. A second hybrid image generated with respect to the cluster denotes a maxima image, wherein a constituent element of second hybrid item bears a largest pixel value among a dataset associated with the cluster. In an example, a button may be used to select between "min" or "max" images.

Figure 10:
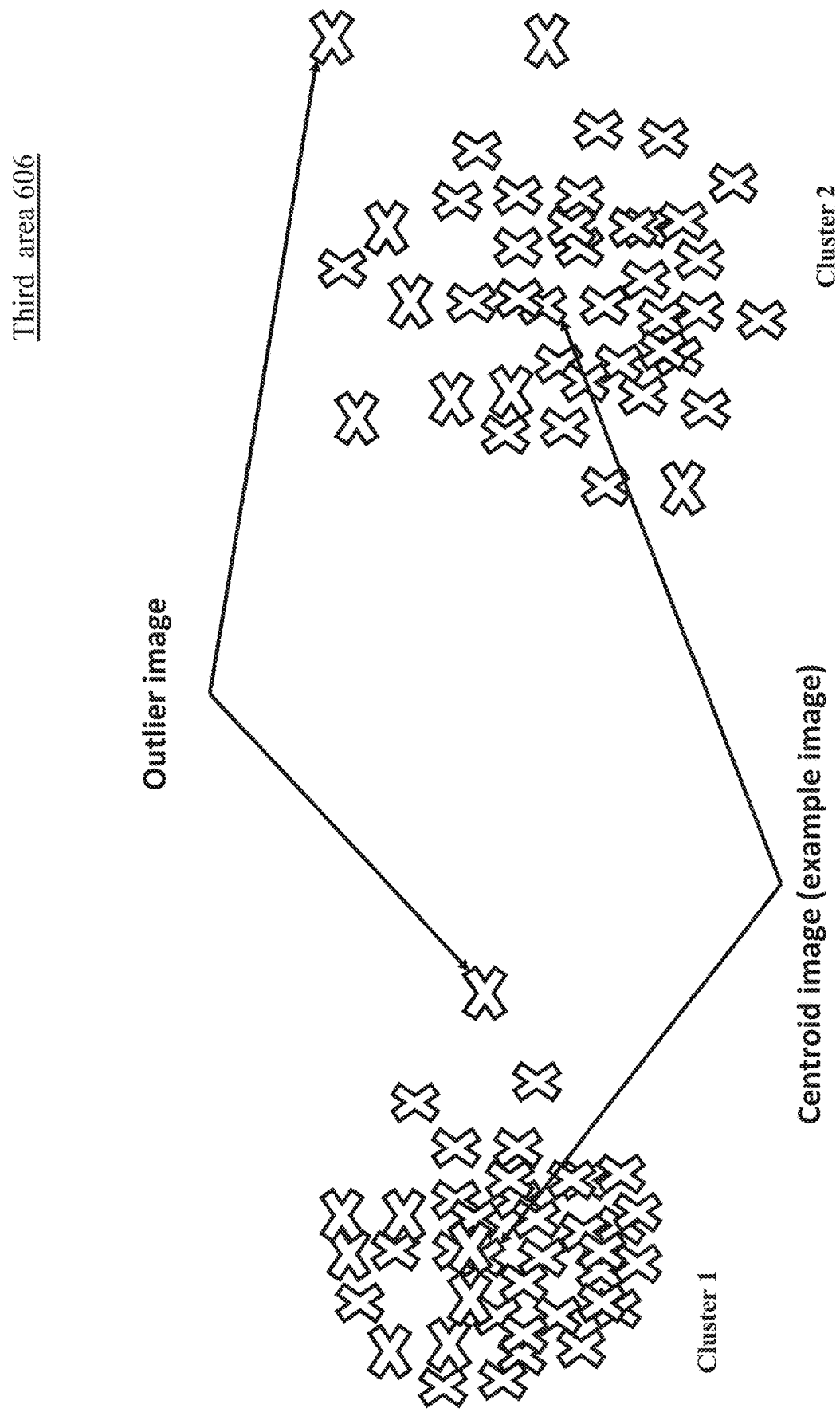
FIG. 10 illustrates relation of example representative images with respect to a cluster, in accordance with another embodiment of the present disclosure.

FIG. 10 illustrates relation of example representative images with respect to a cluster, in accordance with another embodiment of the present disclosure. A plurality of types of image-representations are illustrated in the third area which may be defined as a first image closest to the centroid of the cluster and a second image farthest from centroid of the cluster. "Example image" as shown in FIG. 10 represents the most representative sample. Technically, it may the closest image to the cluster center. A button may be used to select the next closest image from the cluster centre, or move back, and etc. "Outlier image" may be the least representative sample. Technically, it may be the furthest away to the cluster center. A button may be used to select the next least representative sample, or move back, and etc. However, unlike images in FIG. 9 which are the hybrid images of the cluster, the images shown in FIG. 10 represent the original images of the cluster. The images represented in FIG. 9 and FIG. 10, together describe the cluster and are used to determine whether all the samples belong to the same class.

Further, in case the user is not satisfied with the images in FIG. 9 and/or FIG. 10, it may indicate the selected cluster 468 is not appropriate or an inaccurate cluster. In such a scenario, the user may modify the earlier used number of principal component features through the control "Principal component analysis", or depth of the dendrogram levels through control "Dendrogram levels" depicted in FIG. 7 and thereafter re-observe the selected cluster 468 through the images in FIG. 8 and FIG. 9. If the user is now satisfied with images of FIG. 8 and FIG. 9, the user approves the cluster 468 and moves to FIG. 11 for exporting the dataset and labels. In other scenario, the user may reject cluster 468 and move to next cluster at the same or lower hierarchy within the first area 602.

In other example, wherein instead of depicting images in the third area 606, other types of content representations may be depicted in respect of other type of single media or multimedia content items. In an example, in respect of single media item such as sound, the sound may be played in the third area 606. In an example, in respect of single media item such as text, the text may be depicted in the third area 606. In other example, in respect of multimedia such as video, the video or the multimedia samples may be played for user inspection in third area 606.

Figure 11:
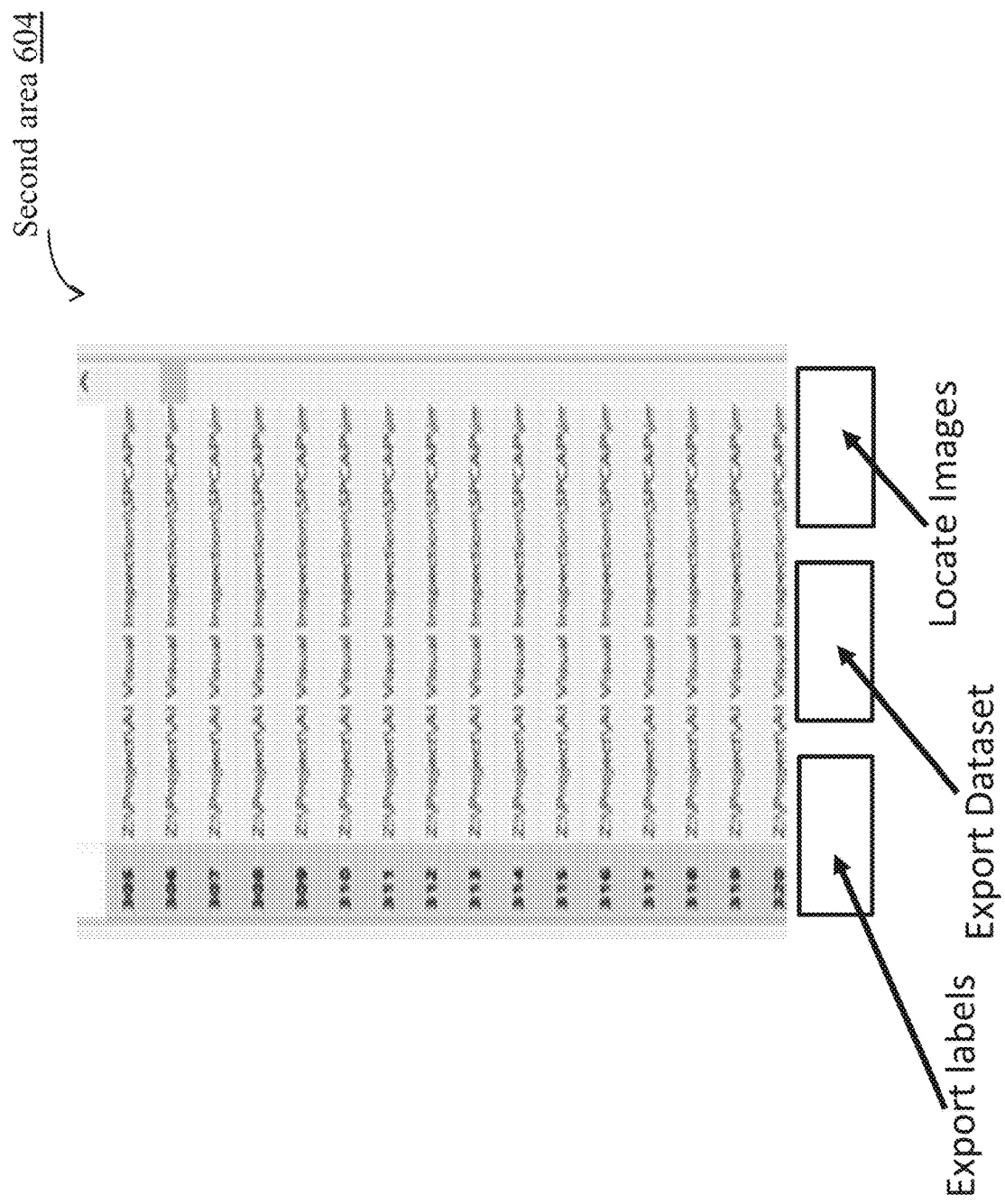
FIG. 11 illustrates another example GUI representation, in accordance with another embodiment of the present disclosure.

FIG. 11 illustrates another example GUI representation and thereby depicts the second area 604 of the GUI comprising the data set. The second area 604 further comprises a plurality of graphical controls for selecting one or more items from the dataset, selecting one or more items from the dataset for locating within the graphical tree representation or dendrogram, annotating multiple items within the dataset and exporting annotated dataset. These buttons allow saving of data per cluster basis at a given instant. Overall, the user is able to select multiple items from the dataset in the second area 604, provide one annotation and copy it immediately to all the selected images, select images within the second area 604 and locate their position in the dendrogram in the first area 602, and finally export the new annotated dataset with respect the cluster 468 if the corresponding representative images in the third area 606 are found satisfactory to the user.

In an example, through a button named "Export labels", the user copies the labelled images ID of the selected cluster into a CSV file which may be further for M.L training. Through a button name "Export Dataset", the selected images of the cluster are allowed to be copied into a dedicated folder named as the class label. Through a button named "Locate images", the folder containing the images is shown. The folder may be selected by an operator to view the images (e.g. through an image viewing software) and allow copying of the images.

Overall, the controls in FIG. 11 allow visualization of specific elements in any clusters and allow export of the clusters one by one. For instance, if the user is satisfied with one cluster, she may export the cluster and remove it from the set depicted in the second area 604. Accordingly, the dendrogram in the first area 602 can be updated and simplified, thereby allowing iterative data labelling.

FIG. 12 refers an example CSV file as obtained through a user clicking the button named "Export labels" in FIG. 11 in respect of the selected cluster and thereby indicates an example outcome from the GUI.

Figure 13:
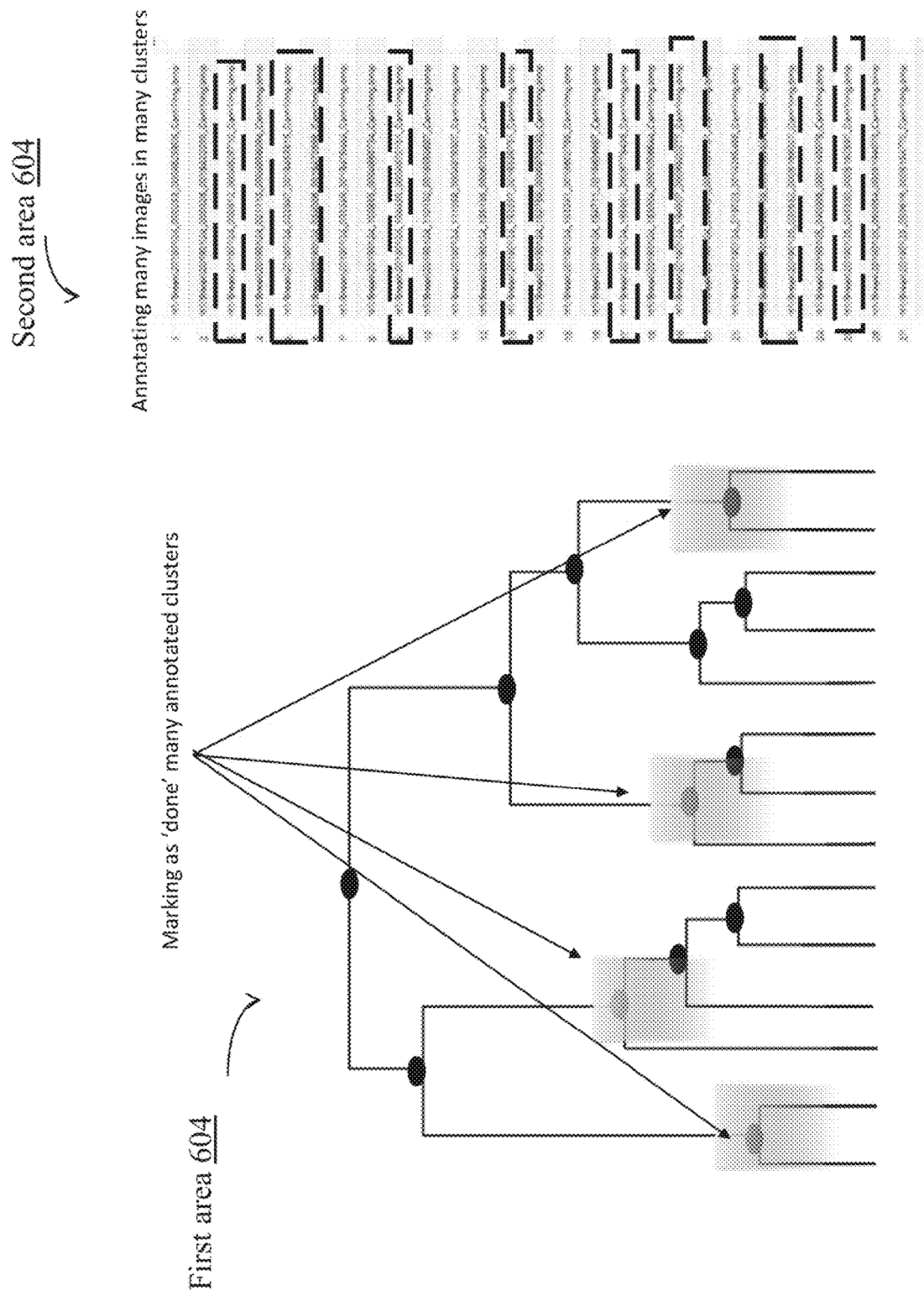
FIG. 13 illustrates an example operation over the dendrogram within the GUI, in accordance with another embodiment of the present disclosure.

FIG. 13 refers an example scenario of selection of four clusters together by the user within the first area 602 for inspection, and accordingly represent an example operation over the dendrogram within the GUI. Accordingly, the corresponding data set in the second area 604 gets highlighted.

Figure 14:
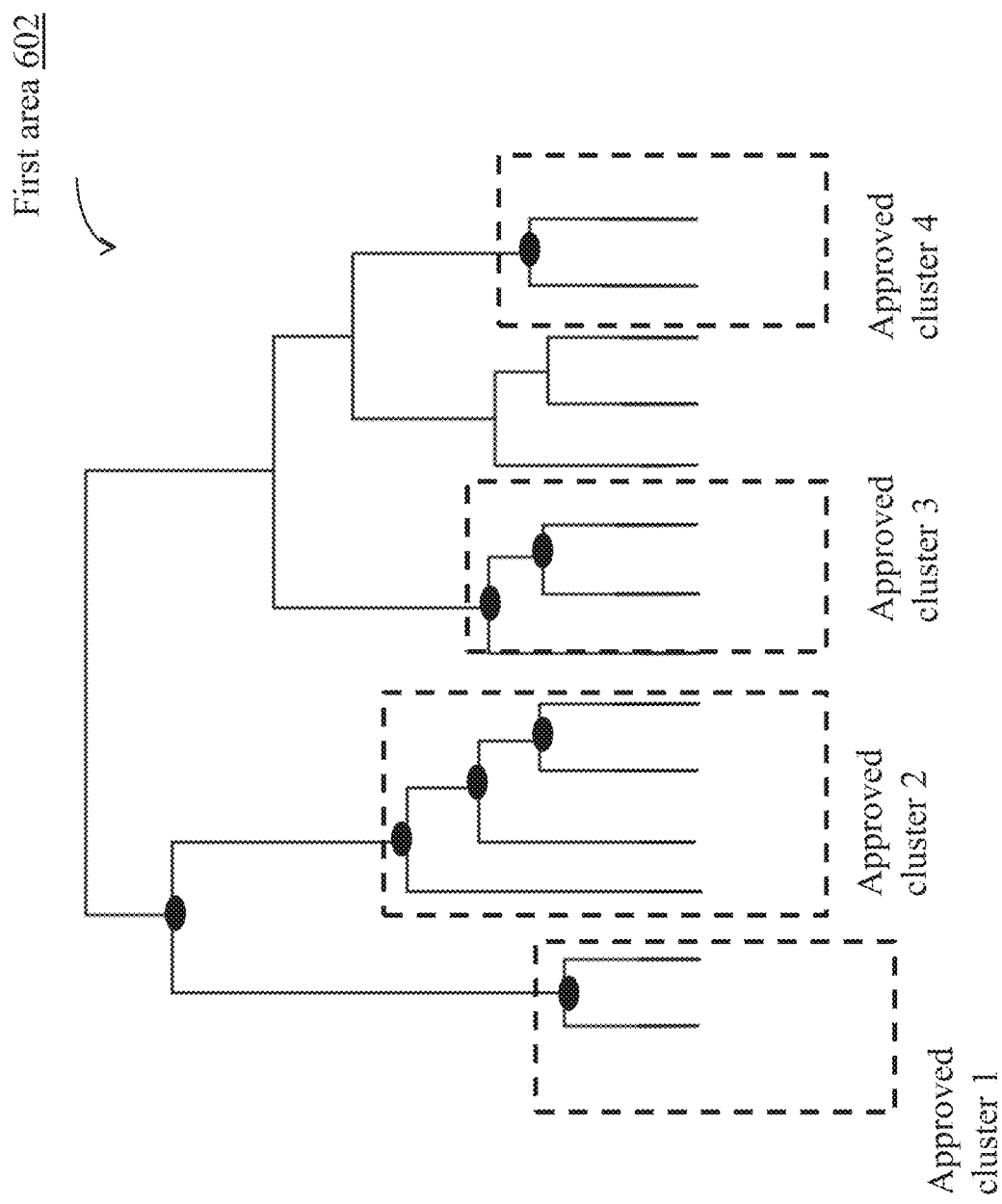
FIG. 14 illustrates another example outcome from the GUI, in accordance with another embodiment of the present disclosure.

FIG. 14 represents the four user-approved clusters within the dendrogram and accordingly depicts another example outcome from the GUI. Accordingly, four designated folders may be created through the "export data set" button in FIG. 11 which may be named by default as Cluster 1, Cluster 2, Cluster 3 and Cluster 4.

Figure 15:
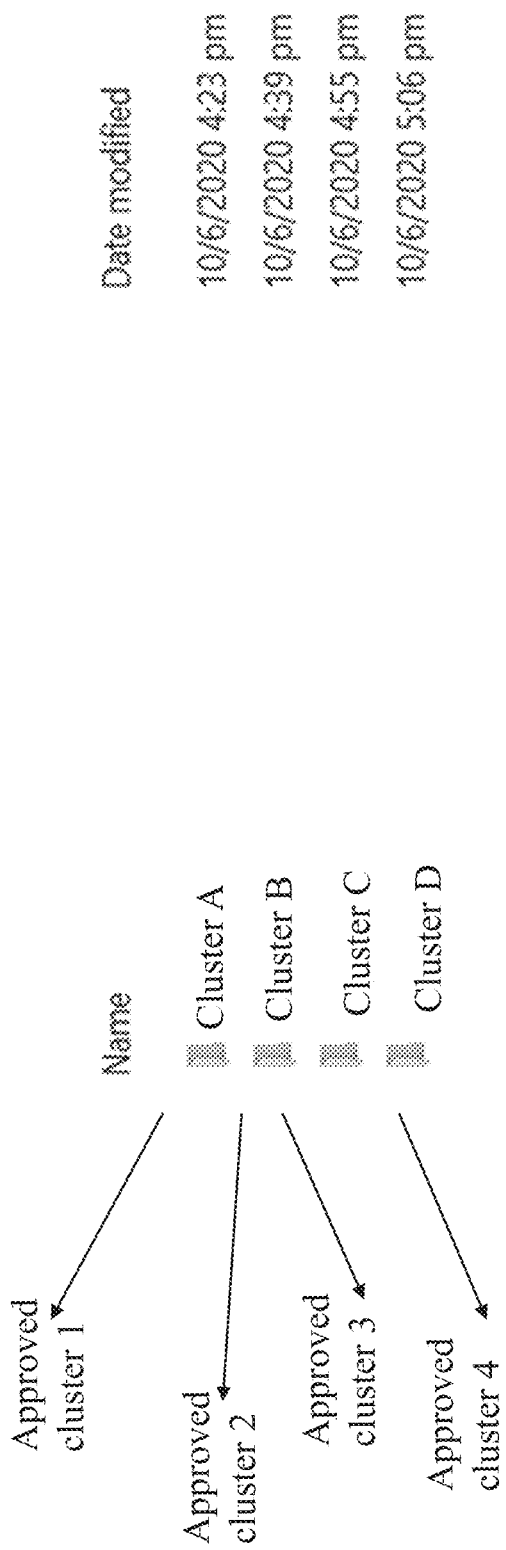
FIG. 15 illustrates another example outcome from the GUI, in accordance with another embodiment of the present disclosure.

FIG. 15 illustrates another example outcome from the GUI and refers generation of the labelled dataset with respect to Cluster 1, Cluster 2, Cluster 3 and Cluster 4 of FIG. 14 through a user of "Copy image" button in FIG. 7. Optionally, vide said button, cluster folder or image folder may be changed to Cluster A, Cluster B, Cluster C and Cluster D. Thereafter, all the image files will be copied within the corresponding default or renamed folder by the user corresponding to either their cluster number or their label if the user inputted it.

The present subject matter may be further construed to cover the scenario of single media or multimedia content items other than images such as audio, acoustic data and text. Accordingly, each of the dendrogram level corresponds to at least one cluster of content-items formed by execution of a machine-learning classifier over a plurality of input content items, wherein the content items may be any single media or multimedia file such as audio, text or acoustic data. Accordingly, the second area 604 may be configured to display a dataset corresponding to the content-items classified within the clusters. The third area 606 may be configured to display a plurality of types of content representations with respect to each selected cluster.

At least by virtue of preceding description, the present subject matter renders a method for speeding up the annotation process of big image datasets, using interactive unsupervised hierarchical clustering and user-in-the-loop. The GUI which allows the user to interactively explore the relationship of images inside a big dataset, discover coherent groups, get fast overview of each cluster (group) of images, provide annotations for all the members of a cluster and finally export the newly annotated dataset.

The present subject matter renders an interactive approach, with user-in-the-loop, where the user decides which images are grouped together. The user is presented with a hierarchical visualization (dendrogram) of the whole dataset. In this representation, one image may be part of multiple clusters. The user can investigate all the clusters in a tree-structure hierarchical way, get fast feedback on whether each cluster is coherent or not (for example by looking at exemplar and outlier images from each cluster), and intuitively render annotations or labels only to the coherent clusters.

Figure 16:
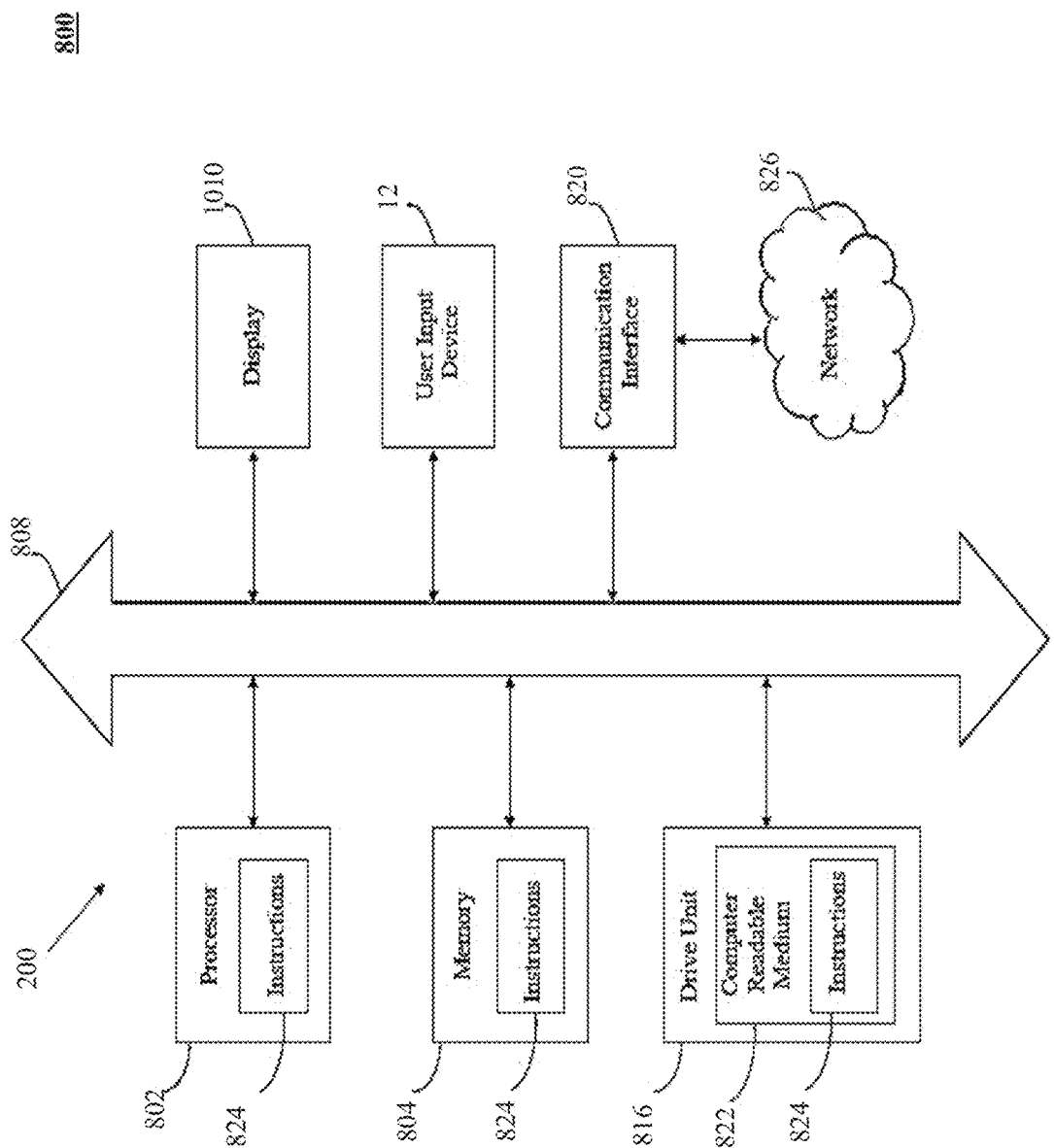
FIG. 16 illustrates an example computing device based implementation, in accordance with another embodiment of the present disclosure.

FIG. 16 illustrates an implementation of the system 200 as illustrated in FIG. 2 in a computing environment. The present figure essentially illustrates the hardware configuration of the system 200 in the form of a computer system 800 is shown. The computer system 800 can include a set of instructions that can be executed to cause the computer system 800 to perform any one or more of the methods disclosed. The computer system 800 may operate as a standalone device or may be connected, e.g., using a network, to other computer systems or peripheral devices.

In a networked deployment, the computer system 800 may operate in the capacity of a server or as a client user computer in a server-client user network environment, or as a peer computer system in a peer-to-peer (or distributed) network environment. The computer system 800 can also be implemented as or incorporated into various devices, such as a personal computer (PC), a tablet PC, a personal digital assistant (PDA), a mobile device, a palmtop computer, a laptop computer, a desktop computer, a communications device, a wireless telephone, a land-line telephone, a web appliance, a network router, switch or bridge, or any other machine capable of executing a set of instructions (sequential or otherwise) that specify actions to be taken by that machine. Further, while a single computer system 800 is illustrated, the term "system" shall also be taken to include any collection of systems or sub-systems that individually or jointly execute a set, or multiple sets, of instructions to perform one or more computer functions.

The computer system 800 may include a processor 802 (e.g., a central processing unit (CPU), a graphics processing unit (GPU), or both. The processor 802 may be a component in a variety of systems. For example, the processor 802 may be part of a standard personal computer or a workstation. The processor 802 may be one or more general processors, digital signal processors, application specific integrated circuits, field programmable gate arrays, servers, networks, digital circuits, analog circuits, combinations thereof, or other now known or later developed devices for analyzing and processing data The processor 802 may implement a software program, such as code generated manually (i.e., programmed).

The computer system 800 may include a memory 804, such as a memory 804 that can communicate via a bus 808. The memory 804 may be a main memory, a static memory, or a dynamic memory. The memory 804 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one example, the memory 804 includes a cache or random access memory for the processor 802. In alternative examples, the memory 804 is separate from the processor 802, such as a cache memory of a processor, the system memory, or other memory. The memory 804 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 804 is operable to store instructions executable by the processor 802. The functions, acts or tasks illustrated in the figures or described may be performed by the programmed processor 802 executing the instructions stored in the memory 804. The functions, acts or tasks are independent of the particular type of instructions set, storage media, processor or processing strategy and may be performed by software, hardware, integrated circuits, firm-ware, micro-code and the like, operating alone or in combination. Likewise, processing strategies may include multiprocessing, multitasking, parallel processing and the like.

As shown, the computer system 800 may or may not further include a display unit 810, such as a liquid crystal display (LCD), an organic light emitting diode (OLED), a flat panel display, a solid state display, a cathode ray tube (CRT), a projector, a printer or other now known or later developed display device for outputting determined information. The display 810 may act as an interface for the user to see the functioning of the processor 802, or specifically as an interface with the software stored in the memory 804 or in the drive unit 816.

Additionally, the computer system 800 may include an input device 812 configured to allow a user to interact with any of the components of system 800. The input device 812 may be a number pad, a keyboard, or a cursor control device, such as a mouse, or a joystick, touch screen display, remote control or any other device operative to interact with the computer system 800.

The computer system 800 may also include a disk or optical drive unit 816. The disk drive unit 816 may include a computer-readable medium 822 in which one or more sets of instructions 824, e.g. software, can be embedded. Further, the instructions 824 may embody one or more of the methods or logic as described. In a particular example, the instructions 824 may reside completely, or at least partially, within the memory 804 or within the processor 802 during execution by the computer system 800. The memory 804 and the processor 802 also may include computer-readable media as discussed above.

The present invention contemplates a computer-readable medium that includes instructions 824 or receives and executes instructions 824 responsive to a propagated signal so that a device connected to a network 826 can communicate voice, video, audio, images or any other data over the network 826. Further, the instructions 824 may be transmitted or received over the network 826 via a communication port or interface 820 or using a bus 808. The communication port or interface 820 may be a part of the processor 802 or may be a separate component. The communication port 820 may be created in software or may be a physical connection in hardware. The communication port 820 may be configured to connect with a network 826, external media, the display 810, or any other components in system 800 or combinations thereof. The connection with the network 826 may be a physical connection, such as a wired Ethernet connection or may be established wirelessly as discussed later. Likewise, the additional connections with other components of the system 800 may be physical connections or may be established wirelessly. The network 826 may alternatively be directly connected to the bus 808.

The network 826 may include wired networks, wireless networks, Ethernet AVB networks, or combinations thereof. The wireless network may be a cellular telephone network, an 802.11, 802.16, 802.20, 802.1Q or WiMax network. Further, the network 826 may be a public network, such as the Internet, a private network, such as an intranet, or combinations thereof, and may utilize a variety of networking protocols now available or later developed including, but not limited to TCP/IP based networking protocols.

In an alternative example, dedicated hardware implementations, such as application specific integrated circuits, programmable logic arrays and other hardware devices, can be constructed to implement various parts of the system 800.

Terms used in this disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description of embodiments, claims, or drawings, should be understood to contemplate the possibilities of including one of the terms, either of the terms or both terms. For example, the phrase "A or B" should be understood to include the possibilities of "A" or "B" or "A and B."

All examples and conditional language recited in this disclosure are intended for pedagogical objects to aid the reader in understanding the invention and the concepts contributed by the inventor to furthering the art and are to be construed as being without limitation to such specifically recited examples and conditions. Although embodiments of the present disclosure have been described in detail, it should be understood that various changes, substitutions, and alterations could be made thereto without departing from the spirit and scope of the present disclosure.

The invention claimed is:

1. A graphical user interface (GUI) for forming hierarchically arranged clusters of images and operating thereupon through an electronic device equipped with an input-device and a display-screen, said GUI comprising:
    a first area configured to display a graphical-tree representation having a plurality of hierarchical levels, each of said level corresponds to at least one cluster of images formed by a machine-learning classifier applied over a plurality of input-images;
    a second area configured to display a dataset corresponding to the images within the clusters;
    a third area configured to display a plurality of types of image representations with respect to each cluster, said image representation corresponding to images within the cluster;
    a fourth area having a plurality of user operable graphical tools capable of performing a plurality of functions based on user-inputs; and
    a first user-operable graphical tool for initiating calculation of the similarities between the dataset based on the features, said calculation comprising:
        capturing features of the plurality of input images based on a feature extraction criteria;
        classifying the images among one or more clusters based on feature-similarity;
        ranking the clusters to create a dendrogram representation in the first area as said graphical-tree representation; and
        sequentially arranging the dataset in the second area in accordance with the dendrogram.

2. The GUI as claimed in claim 1, further comprising a second graphical tool in the fourth area operable for reducing latent-space dimensions associated with the captured features of the input images.

3. The GUI as claimed in claim 1, further comprising a third graphical tool in the fourth area operable for changing the hierarchical levels of the graphical-tree representation.

4. The GUI according to claim 1, further comprising a fourth graphical tool in the fourth area to receive a cluster identifier from a user to select one or more clusters within said graphical-tree representation in the first area, wherein said selection is defined by:
    change in color of the selected cluster in the first area; and
    highlighting of dataset in the second area associated with the selected cluster.

5. The GUI according to claim 4, wherein the clusters in the first area are user-selectable to enable selection of the cluster.

6. The GUI according to claim 1, further comprising a fifth graphical tool in the fourth area to receive a cluster label from a user for a selected cluster for labelling the images associated with the cluster.

7. The GUI according to claim 1, wherein the plurality of types of image-representations in the third area are defined by at-least one of:
    a first image closest to the centroid of the cluster,
    a second image farthest from centroid of the cluster,
    a first hybrid image generated with respect to the cluster, wherein a constituent element of first hybrid item bears a smallest pixel value among a dataset associated with the cluster, and
    a second hybrid image generated with respect to the cluster, wherein a constituent element of second hybrid item bears a largest pixel value among a dataset associated with the cluster.

8. The GUI according to claim 1, wherein the second area comprising the data set further comprises a plurality of graphical controls for:
    selecting one or more items from the dataset;
    selecting one or more items from the dataset for locating within the graphical-tree representation;
    annotating multiple items within the dataset; and
    exporting annotated dataset.

9. A graphical user interface (GUI) for forming hierarchically arranged clusters of items and operating thereupon through an electronic device equipped with an input-device and a display-screen, said GUI comprising:
    a first area configured to display a graphical-tree representation having a plurality of hierarchical levels, each of said level corresponds to at least one cluster of content-items formed by execution of a machine-learning classifier over a plurality of input content items;
    a second area configured to display a dataset corresponding to the content-items classified within the clusters; and
    a third area configured to display a plurality of types of content representations with respect to each selected cluster, said representations corresponding to content-items classified within the cluster,
    wherein the plurality of representations in the third area are defined by at-least one of:
        a first content item closest to the centroid of the cluster,
        an second content item farthest from centroid of the cluster, a first hybrid item generated with respect to the cluster, wherein a constituent element of first hybrid item bears a smallest value among a dataset associated with the cluster, and a second hybrid item generated with respect to the cluster, wherein a constituent element of second hybrid item bears a largest value among a dataset associated with the cluster.

10. The GUI as claimed in claim 9, wherein the content items corresponds to a single media or multimedia data defined by one or more of: audio, text, video and wherein each of the cluster is formed based on said features defined as one or more of: sound duration, pitch, zero-crossing rate, the signal bandwidth, the spectral centroid, signal-energy.

* * * * *